United States Patent [19]
Kawabe et al.

[11] Patent Number: 5,171,067
[45] Date of Patent: Dec. 15, 1992

[54] METHOD OF CORRECTING WEIGHT UNBALANCE OF RIM-FITTED TIRE

[75] Inventors: Hiroshi Kawabe; Toshiyuki Watanabe, both of Kodaira; Naotaka Tomita, Sayama, all of Japan

[73] Assignee: Bridgestone Corporation, Japan

[21] Appl. No.: 866,350

[22] Filed: Apr. 10, 1992

[30] Foreign Application Priority Data

Apr. 18, 1991 [JP] Japan .................................. 3-114123

[51] Int. Cl.$^5$ .............................................. B60B 21/00
[52] U.S. Cl. .................................. 301/5 BA; 301/5 B
[58] Field of Search ........................... 301/5 B, 5 BA; 152/154.1

[56] References Cited

U.S. PATENT DOCUMENTS 3,462,198  8/1969  Onufer ............................. 301/5 BA
5,120,113  6/1992  Oyama et al. ..................... 301/5 BA

FOREIGN PATENT DOCUMENTS 60-76401  4/1985  Japan .

OTHER PUBLICATIONS

"Gisholt Method of Balancing"; pp. 13-15; Gisholt Machine Company; 1926.

*Primary Examiner*—Russell D. Stormer
*Attorney, Agent, or Firm*—Oliff & Berridge

[57] ABSTRACT

The magnitude of an amount of correction of unbalance at each axially opposite end face of the rim-fitted tire and the position on a circumference of each of the rim end faces are measured by means of an unbalance measuring machine for simultaneously measuring an amount of correction of static unbalance and an amount of correction of dynamic unbalance. The magnitude of the amount of correction of static unbalance, the position of an amount of correction of static unbalance on a rim periphery for minimizing a magnitude of an amount of correction of residual dynamic unbalance, the magnitude of the amount of correction of residual dynamic unbalance, and the position of the amount of correction of residual dynamic unbalance on the circumference of each of the rim end faces are calculated on the basis of the magnitude of the amount of correction of unbalance and the position of the amount of correction of unbalance on the circumference of each of the rim end faces measured. A balance weight of a magnitude corresponding to the magnitude of the amount of correction of static unbalance is fixed at the calculated position on the rim periphery, and a balance weight of a magnitude corresponding to the magnitude of the amount of correction of residual dynamic unbalance is fixed at the calculated position on the circumference of each of the rim end faces, thereby correcting weight unbalance of the rim-fitted tire.

7 Claims, 10 Drawing Sheets

METHOD OF CORRECTING WEIGHT UNBALANCE OF RIM-FITTED TIRE

BACKGROUND OF THE INVENTION

1. Field of the Invention

The present invention relates to a method of correcting a weight unbalance of a rim-fitted tire by using a wheel balancer.

2. Description of the Related Art

It is well-known that vibrations occur if a rim-fitted tire with unbalanced weight is rotated. Such a weight unbalance includes a static unbalance in which the weight is determined without rotating the rim-fitted tire and a dynamic unbalance which occurs only when the tire is rotated.

As a method of correcting such an unbalance, nowadays, a method is mainly adopted in which the rim fitted tire is mounted on a wheel balancer and rotated to measure the amount of unbalance requiring correction, and one balance weight is fixed at one location on each axially opposite end face of the rim, usually on each of observe and reverse rim flanges, on the basis of that measurement. In this way, the static unbalance and the dynamic unbalance are corrected simultaneously.

That is, this correcting method is called a two-plane balancing method, in which by assuming that there is one unbalance on each opposite end face of the rim, correction is effecting by fixing a correcting balance weight whose weight is equivalent to that of the unbalance is fixed to a position 180° opposite to the position where the unbalance is located on each end face.

It is well-known that the static unbalance and the dynamic unbalance, whichever is present, can constitute a source of vibration for a vehicle, and that the respective unbalances exert different influences on the vehicle. That is, the static unbalance causes vertical vibration of a vehicle, while the dynamic unbalance causes abnormal vibration of the steering wheel, shimmy, and the like.

There are cases where the vertical vibration of the vehicle, the abnormal vibration of the steering wheel, and the like are caused by the uniformity of the tire (radial force variations and lateral force variations), in addition to the weight unbalance. However, an actual examination of the vibrations after complete correction of the unbalance reveals that components which are conceivably ascribable to a weight unbalance other than that based on uniformity are included. This tendency is strong when the amount of unbalance requiring correction, particularly the dynamic unbalance component, is large.

SUMMARY OF THE INVENTION

Accordingly, it is an object of the present invention to provide a method of correcting weight unbalance of a rim-fitted tire in which vertical and horizontal vibrations constituting sources of vibration of the tire in a situation where the tire is actually used, thereby overcoming the above-described drawback of the conventional art.

To this end, in accordance with the invention, a magnitude of an amount of correction of unbalance at each axially opposite end face of the rim-fitted tire and a position of the amount of correction of unbalance on a circumference of each of the rim end faces are measured by means of an unbalance measuring machine for simultaneously measuring an amount of correction of static unbalance and an amount of correction of dynamic unbalance; the magnitude of the amount of correction of static unbalance, a position of an amount of correction of static unbalance on a rim periphery for minimizing a magnitude of an amount of correction of residual dynamic unbalance, the magnitude of the amount of correction of residual dynamic unbalance, and a position of the amount of correction of residual dynamic unbalance on the circumference of each of the rim end faces are calculated on the basis of the magnitude of the amount of correction of unbalance and the position of the amount of correction of unbalance on the circumference of each of the rim end faces; and a balance weight of a magnitude corresponding to the magnitude of the amount of correction of static unbalance is fixed at the position of the amount of correction of static unbalance on the rim periphery, and a balance weight of a magnitude corresponding to the magnitude of the amount of correction of residual dynamic unbalance is fixed at the position of the amount of correction of residual dynamic unbalance on the circumference of each of the rim end faces.

In the present invention, the unbalance and the dynamic unbalance are corrected separately on the basis of the magnitude of the amount of correction of unbalance and the position on the circumference of each of the rim end faces, by means of an unbalance measuring machine for simultaneously measuring an amount of correction of static unbalance and an amount of correction of dynamic unbalance. At this time, the position of the amount of correction of static unbalance on the rim periphery is calculated in such a manner as to minimize a magnitude of an amount of correction of residual dynamic unbalance. A balance weight of a magnitude corresponding to the calculated magnitude of the amount of correction of static unbalance is fixed at the calculated position on the rim periphery, and a balance weight of a magnitude corresponding to the calculated magnitude of the amount of correction of residual dynamic unbalance is fixed at the calculated position on the circumference of each of the rim end faces, thereby correcting weight unbalance. Thus, by determining the position of the amount of correction of static unbalance on the periphery of the rim, the magnitude of the amount of correction of residual dynamic unbalance is minimized without increasing the magnitude of the amount of correction of static unbalance. As a result, it is possible to obtain a rim-fitted tire having excellent performance and capable of preventing the vertical vibration of the vehicle, the abnormal vibration of the steering wheel, and the like, which are ascribable to a weight unbalance other than uniformity.

Alternatively, an arrangement may be adopted as follows. That is, after the position of the rim-fitted tire relative to the mounting shaft of the unbalance measuring machine is changed by, for instance, 0°, 120°, and 240°, a plurality of measurements are made of the magnitude of the amount of correction of unbalance and the position on the circumference of each of the rim end faces. Then, an average value of the magnitude of the amount of correction of static unbalance and an average value of the position of the amount of correction of static unbalance on the rim periphery are calculated on the basis of the plurality of magnitudes of the amount of correction of unbalance and the positions on the circumference of each of the rim end faces thus measured. Finally, the average value of the magnitude of the amount of correction of static unbalance and the average value of the position of the amount of correction of static unbalance on the rim periphery thus calculated are set as the magnitude of the amount of correction of static unbalance and the position of the amount of correction of static unbalance on the rim periphery. If this arrangement is adopted, the accuracy of the magnitude of the amount of correction of static unbalance and the position on the rim periphery can be improved, so that the correction of unbalance can be effected more accurately.

It should be noted that although the balance weight corresponding to the amount of correction of static unbalance is normally fixed to an inner peripheral surface of the rim, in a case where the correction of unbalance at an ideal position is impossible in the light of the configuration of the rim, a clearance between the balance weight and a brake disk, and other relationships, the correction of static unbalance may be alternatively effected in halves in the vicinity of the widthwise center of the rim or at the left and right positions of the rim flange, respectively, in a manner that will not affect the dynamic unbalance.

As described above, in accordance with the present invention, since the amount of correction of dynamic unbalance is minimized, it is possible to obtain the advantage that a rim-fitted tire having excellent performance and capable of preventing the vertical vibration of the vehicle, the abnormal vibration of the steering wheel, and the like can be obtained.

The other objects, features and advantages of the present invention will become more apparent from the following detailed description of the invention when read in conjunction with the accompanying drawings.

DESCRIPTION OF THE PREFERRED EMBODIMENT

Figure 1:
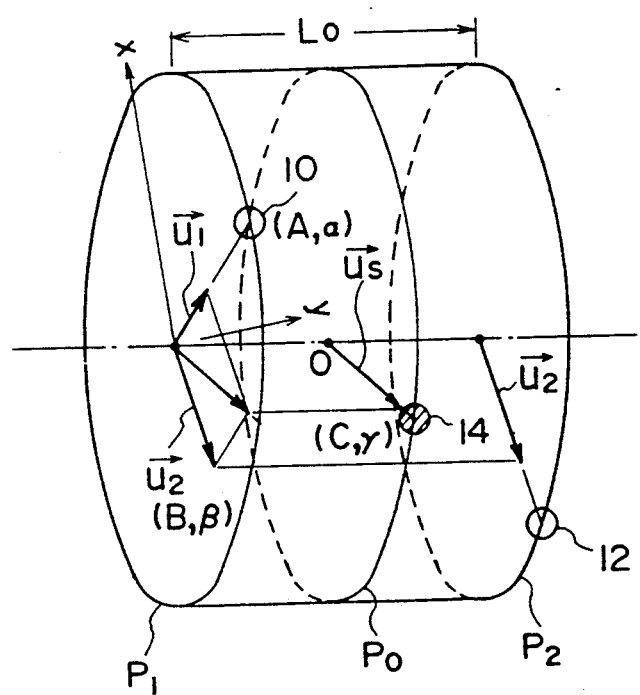
FIG. 1 is a perspective view of a rim illustrating the relation between amounts of correction of unbalance and an amount of correction of static unbalance which are measured by a balancer.
Figure 2:
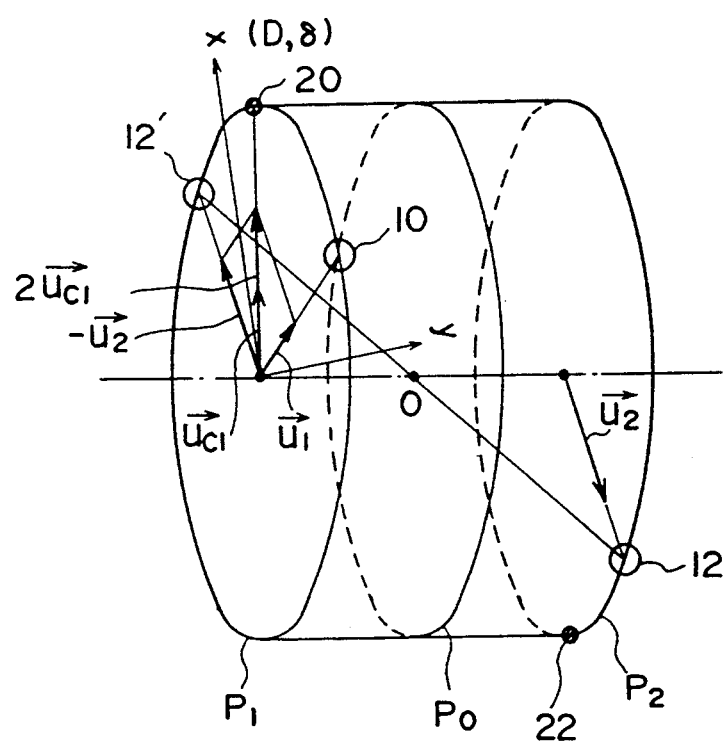
FIG. 2 is a perspective view of the rim illustrating the relation between amounts of correction of unbalance and an amount of correction of static unbalance which are measured by the balancer.
Figure 3:
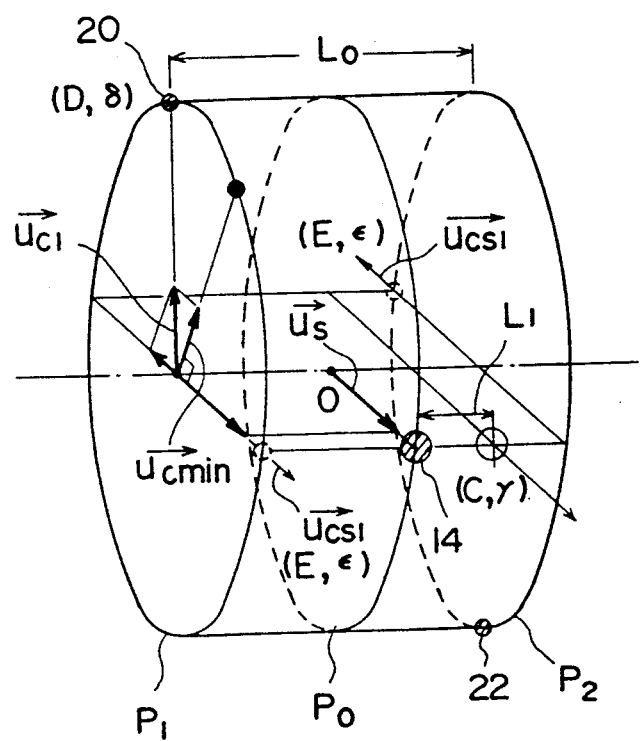
FIG. 3 is a perspective view of the rim illustrating the relation among the amounts of correction of unbalance, an amount of correction of dynamic unbalance, and an amount of correction of residual dynamic unbalance.

Referring first to FIGS. 1 to 3, a description will be given of a basic principle of the present invention. In these drawings and others which follow, the tire portion of the rim-fitted tire is omitted, and only the rim is schematically shown.

As shown in FIG. 1, it is assumed that the planes of opposite end faces of the rim of the rim-fitted tire are a first plane (outer plane) $P_1$ and a second plane (inner plane) $P_2$, respectively, a plane parallel with the first plane $P_1$ and the second plane $P_2$ and passing through a center O of the rim is a rim center plane $P_0$. In addition, the width of the rim (distance between the first plane $P_1$ and the second plane $P_2$) is assumed to be $L_0$, and orthogonal coordinates having the center of the first plane $P_1$ as an origin are set in the first plane $P_1$. Furthermore, it is assumed that, as a result of measurement using an unbalance measuring machine for simultaneous correction of the static and dynamic unbalances, which is generally used widely for simultaneously correcting the static unbalance and the dynamic unbalance, an amount of unbalance to be corrected 10, i.e., a vector quantity, is required on a circumference in the first plane $P_1$ (on the circumference of the rim end face), while an amount of unbalance to be corrected 12, i.e., a vector quantity, is required on a circumference in the second plane $P_2$. These amounts of unbalance to be corrected 10, 12 are expressed by a vector U1 and a vector U2, respectively.

Since the amount of static unbalance to be corrected and the amount of dynamic unbalance to be corrected are included in the amounts of unbalance to be corrected 10, 12, the amount of static unbalance to be corrected and the amount of dynamic unbalance to be corrected are separated from each other, and only the amount of static unbalance to be corrected is first determined. The static unbalance occurs when the center of gravity of the rim-fitted tire is not present on the axis of rotation of the tire. To correct this static unbalance, it suffices if an amount of correction equivalent to the weight of an unbalance, i.e., a balance weight, is fixed at an opposite position (on the 180° opposite side) to the side where the unbalance occurs. If a case is considered in which static unbalance is corrected with one amount of correction of static unbalance in FIG. 1, it suffices if the vectors of the amounts of correction of unbalance 10, 12 are combined, and an amount of correction of static unbalance 14 having the same magnitude as that of their resultant vector Us is fixed at a position, expressed by the resultant vector Us, on the circumference in the rim center plane P0. If it is assumed that the magnitude of the vector U1 is A, an angle thereof with respect to the x-axis is $\alpha$, the magnitude of the vector U2 is B, an angle thereof with respect to the x-axis is $\beta$, the magnitude of the resultant vector Us is C, and an angle thereof with respect to the x-axis, i.e., the position on the circumference in the rim center plane, is $\gamma$, then C and $\gamma$ can be expressed by the following Formulae (1) and (2):

$$C = \sqrt{(A\cos\alpha + B\cos\beta)^2 + (A\sin\alpha + B\sin\beta)^2} \quad (1)$$

$$\gamma = \tan^{-1}\{(A\sin\alpha + B\sin\beta)/(A\cos\alpha + B\cos\beta)\} \quad (2)$$

Next, the dynamic unbalance is an unbalance caused by the moment occurring when the tire is rotated in a state in which the static unbalance is established. This is the case where unbalances of the same weight (due to the fact that the static unbalance is absent) are present at positions offset 180° in the first plane $P_1$ and the second plane $P_2$, respectively. To correct these unbalances, it suffices if an amount of correction equivalent to that of the unbalance is fixed at opposite positions (on the 180° opposite side) to the side where the unbalance occurs in the first plane $P_1$ and the second plane $P_2$.

The dynamic unbalance is ascribable to the moment, and even if the amount of correction of unbalance 12 in the second plane $P_2$ in FIG. 1 is moved to a position in the first plane $P_1$ on the 180° opposite side and is set as an amount of correction of unbalance 12,, there is no change in the clockwise moment, so that the dynamic unbalances in FIGS. 1 and 2 are equivalent. If a case is considered in which dynamic unbalance is corrected with two amounts of correction of dynamic unbalance in FIG. 2, it suffices if the vectors of the amounts of correction of unbalance 10, 12' are combined, and an amount of correction of dynamic unbalance 20 whose magnitude is $\frac{1}{2}$ that of their resultant vector is fixed at a position, expressed by the resultant vector, on the circumference in the first plane $P_1$, and an amount of correction of dynamic unbalance 22 of the same magnitude as that of the amount of correction of dynamic unbalance 20 is fixed at a position in the second plane $P_2$ on the 180° opposite to the position where the amount of correction of dynamic unbalance 20 is fixed. If it is assumed that a $\frac{1}{2}$ vector of the resultant vector is $Uc_1$, the magnitude of the vector $Uc_1$ is D, and an angle thereof with respect to the x-axis, i.e., the position on the circumference of the rim end face, is $\delta$, then D and $\delta$ can be expressed by the following Formulae (3) and (4) since the resultant vector = vector U1 − vector U2:

$$D = \sqrt{(A\cos\alpha - B\cos\beta)^2 + (A\sin\alpha - B\sin\beta)^2}\,/2 \quad (3)$$

$$\delta = \tan^{-1}\{(A\sin\alpha - B\sin\beta)/(A\cos\alpha - B\cos\beta)\} \quad (4)$$

If a balance weight of the magnitude expressed by Formula (1) is fixed at a position in the rim center plane expressed by Formula (2), and balance weights of the magnitude expressed by Formula (1) are respectively fixed at positions at opposite end faces of the rim expressed by Formula (4), it follows that the unbalance is tentatively corrected. In the present invention, the amount of correction of dynamic unbalance is further minimized in the procedure which will be described below.

Next, to minimize the amount of correction of dynamic unbalance, as shown in FIG. 3, the amount of correction of static unbalance 14 is moved to a position removed by a distance $L_1$ along the axis of rotation from the rim center plane P0 toward the second plane P2. It should be noted, however, that the direction of the distance $L_1$ heading from the second plane $P_2$ toward the first plane $P_1$ is set as positive. As the amount of correction of static unbalance 14 is moved to the position removed by the distance $L_1$ in this manner, a new dynamic unbalance is produced. If an amount of correction of dynamic unbalance necessary for correcting this dynamic unbalance is assumed to be a vector $U_{cs1}$, and a balance of the moment about the center O of the tire is considered, the magnitude E of the vector $U_{cs1}$ is expressed as shown below, and changes in proportion to the distance $L_1$.

$$E.L_0 = C.L_1$$

$$E = C.L_1/L_0 \quad (5)$$

Meanwhile, if the amount of correction of static unbalance 14 is moved in a negative direction, the position (phase) of the vector $U_{cs1}$ assumes the same phase as that of the position of correction of static unbalance with respect to the first plane $P_1$, and is located at a position 180° opposite to the position of correction of static unbalance with respect to the second plane $P_2$. On the other hand, if the amount of correction of static unbalance 14 is moved in a positive direction, the position of the vector $U_{cs1}$ is located at a position 180° opposite to the position of correction of static unbalance with respect to the first plane $P_1$, and assumes the same phase as that of the position of correction of static unbalance with respect to the second plane $P_2$. If the amount of correction of static unbalance is moved in the positive direction, the phase $\epsilon$ of the vector $U_{cs1}$ in the first plane is expressed as $$\epsilon = \gamma + 180 \quad (6)$$

If the magnitude of the distance $L_1$ is determined in such a manner that the component of the vector $Uc_1$ in the direction of the vector $U_{cs1}$ is offset by this vector $U_{cs1}$, the amount of correction of dynamic unbalance after the amount of correction of static unbalance is moved, i.e., an amount of correction of residual dynamic unbalance, becomes minimum.

Since the magnitude of the component of the vector $Uc_1$ in the direction of the vector $U_{cs1}$ becomes $D.\cos(\delta - \gamma)$, the magnitude E of the vector $U_{cs1}$ for minimizing the amount of correction of residual dynamic unbalance can be expressed as follows:

$$E = D.\cos(\delta - \gamma) \quad (7)$$

Accordingly, from Formulae (5) and (7), the distance $L_1$ can be expressed as $$L_1 = D.L_0 \cdot \cos(\delta - \gamma)/C \quad (8)$$

That is, the magnitude of the amount of correction of dynamic unbalance remaining in the first plane $P_1$ and the second plane $P_2$ in a state in which an amount of correction of static unbalance is present at the position expressed by Formula (8) becomes minimum.

However, it goes without saying that since the width of the rim is $L_0$, the range which the distance $L_1$ is capable of assuming is not infinite, and is restricted to $L_0/2 \leq L_1 \leq L_0/2$.

Next, the magnitude and position of the amount of correction of dynamic unbalance remaining when $-L_0/2 \leq L_1 \leq L_0/2$ are determined. If it is assumed that the amount of correction of dynamic unbalance remaining in the first plane $P_1$ is a vector $U_{cmin}$, its magnitude is $M_{min}$, and its phase (position) is $\theta_{min}$, since the vector $U_{cmin}$ can be expressed by a resultant vector of the vector $U_{c1}$ and the vector $U_{cs1}$, the magnitude $M_{min}$ can be expressed as $$M_{min} = \sqrt{\{(D\cos\delta + E\cos\epsilon)^2 + (D\sin\delta + E\sin\epsilon)^2\}} \quad (9)$$

If Formula (9) is rearranged by using the relationship between $\epsilon$ and $\gamma$ in Formula (6) as well as Formula (7), we obtain the following Formula (10):

$$M_{min} = \sqrt{\{(D\cos\delta - D\cdot\cos(\delta-\gamma)\cos\gamma)^2 + (D\sin\delta - D\cdot\cos(\delta-\gamma)\sin\gamma)^2\}} \quad (10)$$

$$= \sqrt{\{D^2 - D^2\cos^2(\delta-\gamma)\}}$$

$$= |D\sin(\delta-\gamma)|$$

Meanwhile, the phase $\theta_{min}$ is expressed as the following Formula (11):

$$\theta_{min} = \tan^{-1}\{(D\sin\delta + E\sin\epsilon)/(D\cos\delta + E\cos\epsilon)\} \quad (11)$$

$$= \tan^{-1}\{(\sin\delta - \cos(\delta-\gamma)\sin\gamma)/(\cos\delta - \cos(\delta-\gamma)\cos\gamma)\}$$

When $L_1 = \pm L_0/2$, it follows that $\frac{1}{2}$ of the amount of correction of static unbalance 14 is present in the first plane and the second plane, respectively. With respect to the first plane, an amount of correction whose magnitude is $\frac{1}{2}$ of the amount of correction of static unbalance 14 is present is present at the position of $L_1 = L_0/2$, so that the relation of the vector $U_{cmin} =$ vector $U_{c1} - \frac{1}{2}$ vector $U_s$ holds. Accordingly, the magnitude $M_{min}$ and phase $\theta_{min}$ of the vector $U_{cmin}$ is expressed as follows:

$$M_{min} = \sqrt{(D\cos\delta - C/2\cdot\cos\gamma)^2 + (D\sin\delta - C/2\cdot\sin\gamma)^2} \quad (12)$$

$$\theta_{min} = \tan^{-1}\{(D\sin\delta - C/2\cdot\sin\gamma)/(D\cos\delta - C/2\cdot\cos\gamma)\} \quad (13)$$

Similarly, with respect to the second plane, the magnitude of the amount of correction of dynamic unbalance becomes $M_{min}$ of the same magnitude as that of the amount of correction of dynamic unbalance for the first plane, and the position of the amount of correction of dynamic unbalance on the circumference on the rim end face becomes $-\theta_{min}$.

Accordingly, the unbalance of a rim-fitted tire can be corrected if a balance weight having the magnitude C is fixed at positions on the periphery of the rim, which are expressed by the position $\gamma$ on the circumference in the rim center plane and the position $L_1$ in the axial direction of the rim, and if a balance weight having the magnitude $M_{min}$ is fixed at the position $\theta_{min}$ on the circumference of one rim end face and a balance weight having the magnitude $M_{min}$ is fixed at the position $-\theta_{min}$ on the circumference of the other rim end face.

EXAMPLE 1

A more detailed description will be given hereafter by citing an example wherein the invention was implemented by using an assembly in which the tire was actually mounted on a wheel.

The size of the tire used was 195/60R14, the size of the wheel was 6J-14, and the wheel rim width $L_0$ was 15 cm.

The amount of correction of unbalance was measured with respect to the first plane $P_1$ and the second plane $P_2$ by means of an unbalance measuring machine. The phase (angle) was measured clockwise from the position of a valve.

Plane $P_1$: $A = 40$ g, $\alpha = 355°$ (position $R_5$)

Plane $P_2$: $B = 50$ g, $\beta = 20°$ (position $R_6$)

Figure 4:
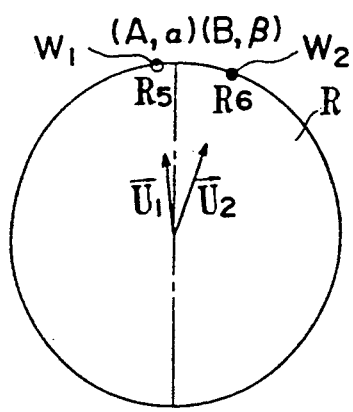
FIG. 4 is a side elevational view of the rim illustrating a state in which balance weights determined in accordance with a conventional two-plane balancing method are fixed to the same rim-fitted tire as that used in Example 1.
Figure 5:
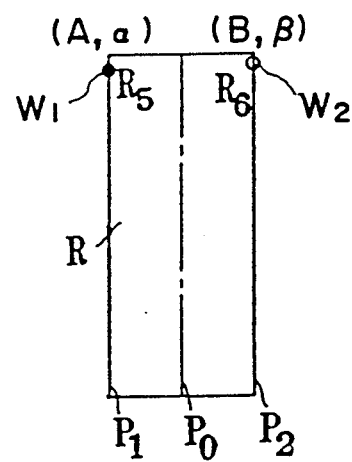
FIG. 5 is a side elevational view of FIG. 4.

FIGS. 4 and 5 show the rim R to which balance weights $W_1$, $W_2$ of the amounts of correction measured by the unbalance measuring machine were fixed as they were. FIG. 4 is a side elevational view of that rim R, and FIG. 5 is a front elevational view of the rim R shown in FIG. 4.

The amount of correction of static unbalance C calculated on the basis of Formula (1) was 87.9 g. In addition, the phase $\gamma$ calculated on the basis of Formula (2) at that time was 8.9°.

As for the vector quantity D and the phase $\delta$ thereof for correction of the dynamic unbalance unbalance component, D and $\delta$ were determined as 10.9 g and 70.7° from Formulae (3) and (4), respectively.

Here, the amount of correction of static unbalance, 87.9 g, was moved in the widthwise direction of the rim while the phase 8.9 was being maintained, so as to determine a minimum value of the amount of dynamic unbalance.

From Formula (8), the distance $L_1$ of that movement was calculated as 0.88 cm (position $R_7$). Since the value of this $L_1$ fell within the rim width (15 cm) of the wheel, the minimum value $M_{min}$ of the amount of correction of dynamic unbalance was determined to be 9.6 g from Formula (10). In addition, the phase $\theta_{min}$ was determined to be 81.2° (278.8°) from Formula (11) (position $R_8$).

Accordingly, on the basis of these facts, the amount of correction in the other plane $P_2$ was determined to be 9.6 g, and the angle was determined to be 98.8° (position $R_g$).

Thus, in a case where $L_1$ falls within the rim width of the wheel, the relationship between the position $\gamma$ of the amount of correction of static unbalance and the phase $\theta_{min}$ of the amount of correction of dynamic unbalance assumes a mutually orthogonal positional relation.

Figure 6:
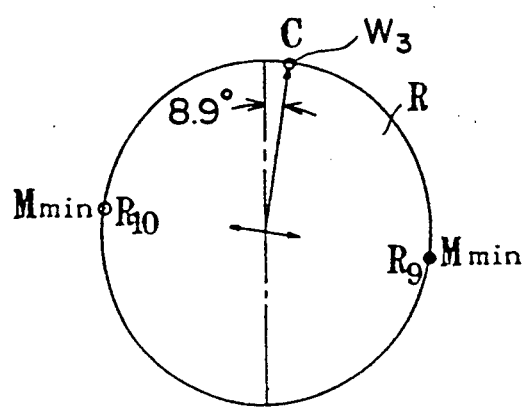
FIG. 6 is a side elevational view of the rim illustrating a state in which the balance weights used in Example 1 are fixed.
Figure 7:
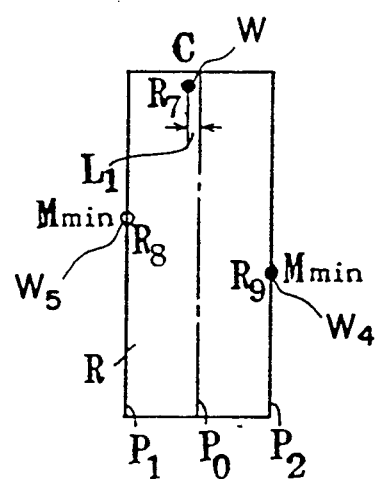
FIG. 7 is a front elevational view of FIG. 6.

FIGS. 6 and 7 show the rim R to which weight balances $W_1$, $W_2$, $W_3$ of the amounts of correction in Example 1 determined in accordance with the correcting method of the present invention were fixed. FIG. 6 is a side elevational view of the rim R, and FIG. 7 is a front elevational view of the rim R shown in FIG. 6.

In the present invention, although the total weight of the balance weights fixed to the wheel was greater than in the case of a conventional measuring method, the amount of correction of dynamic unbalance exhibited a minimal value, and the vibration of the tire was reduced by a remarkable degree, as will be described later.

EXAMPLE 2

The sizes of the tire and the wheel used were of the same types as those of Example 1. That is, the tire size was 195/60R14 and the wheel size was 6J-14. The wheel rim width $L_0$ was similarly 15 cm.

In the same way as Example 1, the amount of correction of unbalance was measured with respect to the first plane $P_1$ and the second plane $P_2$ by means of an unbalance measuring machine.

Plane $P_1$: $A = 45$ g, $\alpha = 25°$ (position $R_{10}$)
Plane $P_2$: $B = 40$ g, $\beta = 200°$ (position $R_{11}$)

Figure 8:
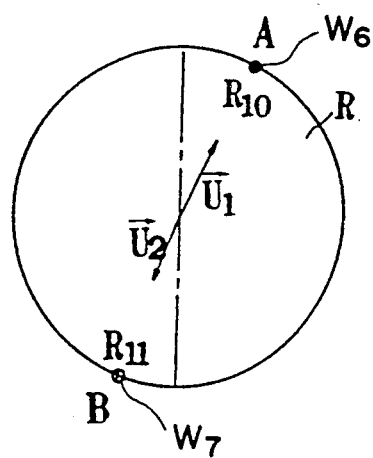
FIG. 8 is a side elevational view of the rim illustrating a state in which balance weights determined in accordance with the conventional two-plane balancing method are fixed to the same rim-fitted tire as that used in Example 2.
Figure 9:
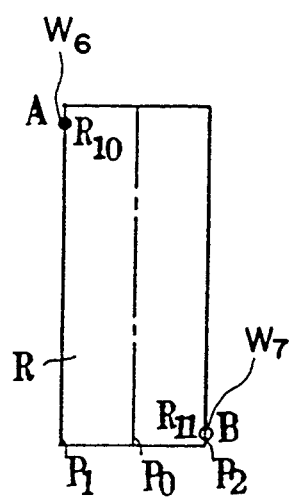
FIG. 9 is a front elevational view of FIG. 8.

FIGS. 8 and 9 show the rim R to which balance weights $W_6$, $W_7$ of the amounts of correction measured by the unbalance measuring machine were fixed as they were. FIG. 8 is a side elevational view of that rim R, and FIG. 9 is a front elevational view of the rim R shown in FIG. 8.

Measurements were made in the same way as in Example 1, and the amount of correction of static unbalance C calculated on the basis of Formula (1) was 6.2 g. Meanwhile, the phase $\gamma$ calculated on the basis of Formula (2) was 58.9°.

In addition, the amount of correction of dynamic unbalance D and the phase $\delta$ were determined to be 42.5 g and 22.6° from Formulae (3) and (4), respectively.

Here, the amount of correction of static unbalance, 6.2 g. was moved in the widthwise direction of the rim while the phase 58.9 was being maintained, so as to determine a minimum value of the amount of dynamic unbalance. From Formula (8), the distance $L_1$ of that movement was calculated as 82.9 cm.

Since the rim width was 15 cm, the value of $L_1$ which represents a minimum value of dynamic unbalance constitutes an axial length from the rim end, which is closest to 82.9 cm. Accordingly, the amount of correction and phase (position $R_{12}$), which is determined under the condition where $L_1$ is 7.5 cm, constitute the minimum value $M_{min}$ and $\theta_{min}$ of dynamic unbalance.

That is, $M_{min}$ in the first plane $P_1$ was calculated as 40 g from Formula (12), while $\theta_{min}$ was calculated as 19.9° (position $R_{13}$) from Formula (13).

On the basis of these facts, $M_{min}$ in the other plane $P_2$ was set at 40 g, and $\theta_{min}$ was set at 199.9° (position $R_g$).

In other words, in a case where the rim width is greater than 82.9 cm, such $\theta_{min}$ would be theoretically located at a position of 58.9° (the phase of the amount of correction of static unbalance) $\pm 90°$, and the minimum value $M_{min}$ thereof would be obtained from Formula (10). To cope with the situation within the actual rim width, however, the actual values used become different from those values.

Figure 10:
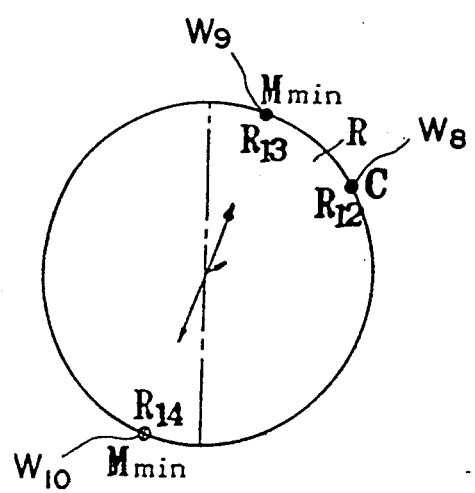
FIG. 10 is a side elevational view of the rim illustrating a state in which the balance weights used in Example 2 are fixed.
Figure 11:
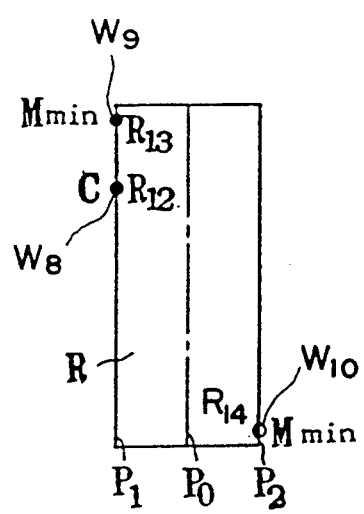
FIG. 11 is a front elevational view of FIG. 10.

FIGS. 10 and 11 show the rim R to which balance weights $W_8$, $W_9$, $W_{10}$ of the amounts of correction in Example 2 determined in accordance with the correcting method of the present invention were fixed. FIG. 10 is a side elevational view of that rim R, and FIG. 11 is a front elevational view of the rim R shown in FIG. 10.

TIRE VIBRATION TEST

A vehicle used in the test was a passenger car, the tire size was 195/60R14, and the wheel size was 6J-14. The tires were mounted on the wheels, and correction of unbalance was effected in accordance with the correcting method of the present invention.

The two rear wheels were mounted on a chassis dynamometer, and an acceleration of the right rear wheel in the transverse direction below a spring was measured when the tire was rotated at a velocity of 100 km/h.

Figure 12:
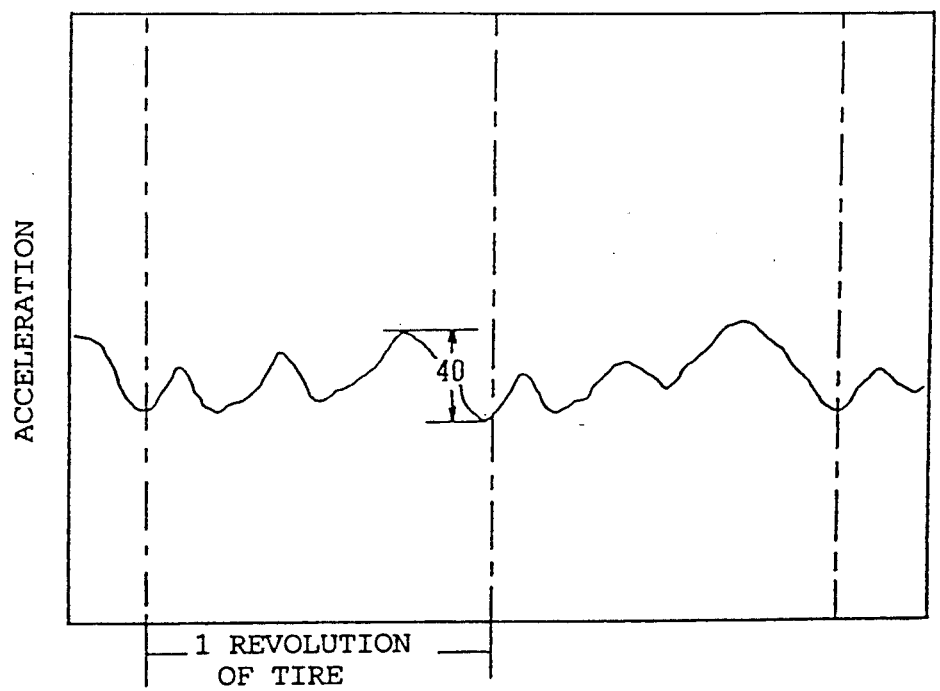
FIG. 12 is a diagram illustrating the acceleration of a rear wheel in a transverse direction below a spring using an actual vehicle in which the rim-fitted tire is mounted in accordance with the correcting method of the present invention.
Figure 14:
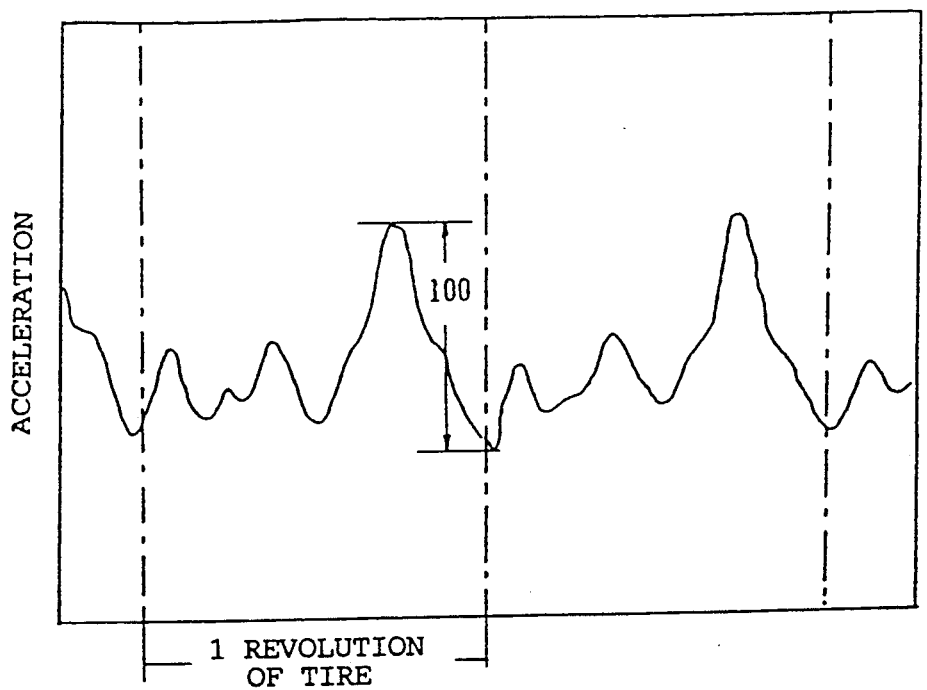
FIG. 14 is a diagram illustrating the acceleration of a rear wheel in the transverse direction below a spring using an actual vehicle in which the rim-fitted tire is mounted in accordance with the conventional two-plane balancing method.

In FIG. 12, the acceleration is plotted as the ordinate, while the revolution of the tire assembly is plotted as the abscissa. FIG. 14 shows the waveform of acceleration of the tire assembly corrected by the conventional two-plane unbalance correcting method by using the same tire. When a maximum amplitude in that case was set as 100, a maximum amplitude of the waveform in accordance with the embodiment of the present invention was 40.

Figure 13:
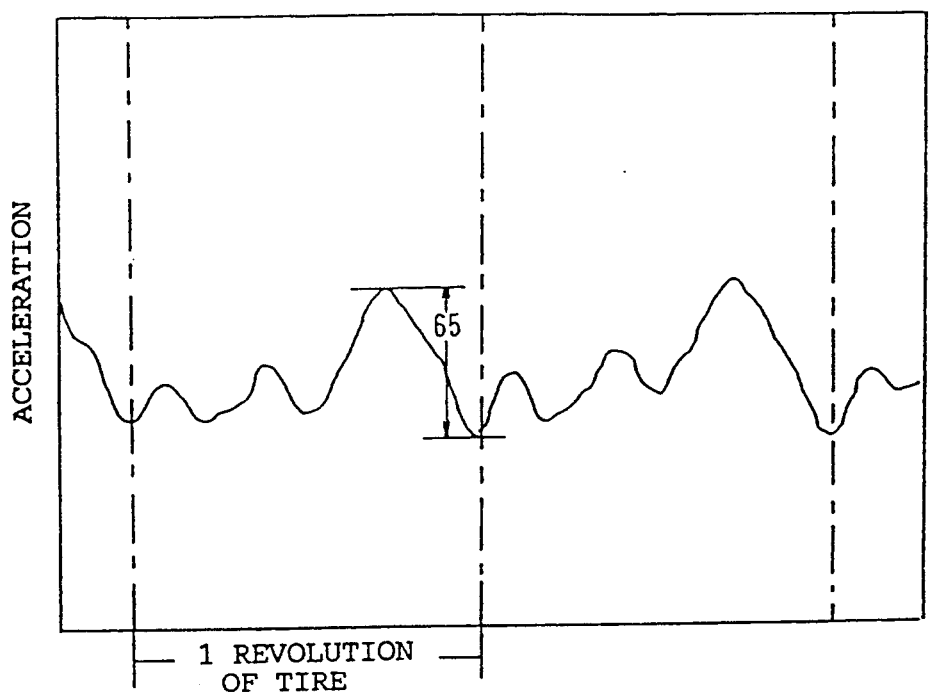
FIG. 13 is a diagram illustrating the acceleration of a rear wheel in the transverse direction below a spring using an actual vehicle in which the rim-fitted tire is mounted in accordance with a simple correcting method of the present invention.

By way of reference, FIG. 13 shows a similar example in which the correction of static unbalance was effected at the wheel center ($L_1 = 0$). In this case, the maximum amplitude was 65, representing a decline as compared with the conventional method.

If a comparison is made of these drawings, as compared with a change in acceleration in the transverse direction below the spring in accordance with the conventional unbalance correcting method (FIG. 14), the change in acceleration in accordance with the correcting method of the present invention was small. It can be appreciated that the change in acceleration in the case shown in FIG. 12, in particular, was small, and was rendered uniform by a remarkable degree.

In the above, a description has been given of examples in which the magnitude of the amount of correction of unbalance and the position on the circumference of each opposite rim end face were are measured once by using an unbalance measuring machine for simultaneously measuring static unbalance and dynamic unbalance, so as to correct unbalance. However, an arrangement may be alternatively adopted as follows. That is, after the position of the rim-fitted tire relative to the mounting shaft of the unbalance measuring machine is changed by, for instance, 0°, 120°, and 240°, three, i.e., a plurality of, measurements are made of the magnitude of the amount of correction of unbalance and the position on the circumference of the rim end face. Then, an average value of the magnitude of the amount of correction of static unbalance and an average value of the position of the amount of correction of static unbalance on a rim periphery are calculated on the basis of the plurality of magnitudes of the amount of correction of unbalance and the positions on the circumference of the rim end face thus measured. Finally, the unbalance is corrected by using the average value of the magnitude of the amount of correction of static unbalance and the average value of the position of the amount of correction of static unbalance on the rim periphery thus calculated. If this arrangement is adopted, the accuracy of the magnitude of the amount of correction of static unbalance and the position on the rim periphery can be improved, so that the correction of unbalance can be effected more accurately.

What is claimed is:

1. A method of correcting weight unbalance of a rim-fitted tire, comprising the steps of:

measuring a magnitude of an amount of correction of unbalance at each axially opposite end face of the rim-fitted tire and a position of the amount of correction of unbalance on a circumference of each of the rim end faces by means of an unbalance measuring machine for simultaneously measuring an amount of correction of static unbalance and an amount of correction of dynamic unbalance;

calculating the magnitude of the amount of correction of static unbalance, a position of an amount of correction of static unbalance on a rim periphery for minimizing a magnitude of an amount of correction of residual dynamic unbalance, the magnitude of the amount of correction of residual dynamic unbalance, and a position of the amount of correction of residual dynamic unbalance on the circumference of each of the rim end faces, on the basis of the magnitude of the amount of correction of unbalance and the position of the amount of correction of unbalance on the circumference of each of the rim end faces; and fixing a balance weight of a magnitude corresponding to the magnitude of the amount of correction of static unbalance at the position of the amount of correction of static unbalance on the rim periphery, and fixing a balance weight of a magnitude corresponding to the magnitude of the amount of correction of residual dynamic unbalance at the position of the amount of correction of residual dynamic unbalance on the circumference of each of the rim end faces.

2. A method of correcting weight unbalance of a rim-fitted tire according to claim 1, wherein a plurality of measurements are made of the magnitude of the amount of correction of unbalance and the position on the circumference of each of the rim end faces by changing the position of the rim-fitted tire relative to a mounting shaft of the unbalance measuring machine, an average value of the magnitude of the amount of correction of static unbalance and an average value of the position of the amount of correction of static unbalance on the rim periphery are calculated on the basis of the plurality of magnitudes of the amount of correction of unbalance and the positions on the circumference of each of the rim end faces measured, and the average value of the magnitude of the amount of correction of static unbalance and the average value of the position of the amount of correction of static unbalance on the rim periphery calculated are set as the magnitude of the amount of correction of static unbalance and the position of the amount of correction of static unbalance on the rim periphery.

3. A method of correcting weight unbalance of a rim-fitted tire according to claim 1, wherein the amounts of correction of unbalance are expressed by vectors, and by combining these vectors, the magnitude of the amount of correction of static unbalance and the position of the amount of correction of static unbalance on the rim periphery are calculated.

4. A method of correcting weight unbalance of a rim-fitted tire according to claim 1, wherein the position of the amount of correction of static unbalance on the rim periphery is expressed by a position $\gamma$ on a circumference in a rim center plane and a distance $L_1$ parallel with an axial direction of the rim and using the rim center plane as a reference, a position on the circumference in the rim center plane and a position on the circumference of each of the rim end faces are expressed by angles using a reference line extending radially of the rim as a reference, and a magnitude C of the amount of correction of static unbalance, the position $\gamma$ of the amount of correction of static unbalance on the circumference in the rim center plane, the distance $L_1$ of the amount of correction of static unbalance in the axial direction of the rim, a magnitude $M_{min}$ of the amount of correction of residual dynamic unbalance at one of the end faces of the rim, and a position $\theta_{min}$ of the amount of correction of residual dynamic unbalance on the circumference of the one of the rim end faces are determined as follows:

(1) when the amount of correction of static unbalance is fixed at a position other than on the axial opposite end faces of the rim $$C = \sqrt{\{(A\cos\alpha + B\cos\beta)^2 + (A\sin\alpha + B\sin\beta)^2\}}$$

$$\gamma = \tan^{-1}\{(A\sin\alpha + B\sin\beta)/(A\cos\alpha + B\cos\beta)\}$$

$$L_1 = D \cdot L_0 \cdot \cos(\delta - \gamma)/C$$

$$M_{min} = |D\sin(\delta - \gamma)|$$

$$\theta_{min} = \tan^{-1}\{(\sin\delta - \cos(\delta - \gamma)\sin\gamma)/(\cos\delta - \cos(\delta - \gamma)\cos\gamma)\}$$

(2) when the amount of correction of static unbalance is fixed at a position on at least one of the axial opposite end faces of the rim $$M_{min} = \sqrt{(D\cos\delta - C/2 \cdot \cos\gamma)^2 + (D\sin\delta - C/2 \cdot \sin\gamma)^2}$$

$$\theta_{min} = \tan^{-1}\{(D\sin\delta - C/2 \cdot \sin\gamma)/(D\cos\delta - C/2 \cdot \cos\gamma)\}$$

where A and B are magnitudes of the amounts of correction of unbalance measured; $\alpha$ and $\beta$ are positions of the amount of correction of unbalance on the circumferences of the rim end faces measured; D is the magnitude of the amount of correction of dynamic unbalance calculated from the amount of correction of unbalance measured by a formula below; $\delta$ is the position of the amount of dynamic unbalance on the circumference of the one of the rim end faces calculated from the amount of correction of unbalance measured by a formula below; and $L_0$ is a distance between the axially opposite end faces of the rim, $$D = \sqrt{(A\cos\alpha - B\cos\beta)^2 + (A\sin\alpha - B\sin\beta)^2} / 2$$

$$\delta = \tan^{-1}\{(A\sin\alpha - B\sin\beta)/(A\cos\alpha - B\cos\beta)\}.$$

5. A method of correcting weight unbalance of a rim-fitted tire according to claim 4, wherein the magnitude of the amount of correction of residual dynamic unbalance on the other end face of the rim is $M_{min}$, and the position of the amount of correction of residual dynamic unbalance on the circumference of the other rim end face is $-\theta_{min}$.

6. A method of correcting weight unbalance of a rim-fitted tire according to claim 4, wherein the magnitude of the amount of correction of dynamic unbalance D and the position $\delta$ on the circumference of the one of the rim end faces are calculated by expressing the amounts of correction of unbalance by vectors, by moving the vectors to one of the rim end faces in such a manner that the moment thereof do not change, and by combining the vectors on said rim end face.

7. A method of correcting weight unbalance of a rim-fitted tire according to claim 1, wherein the amount of correction of static unbalance is fixed to an inner peripheral surface of the rim and the number thereof is 1, the amounts of correction of residual unbalance are fixed on the circumferences of the rim end faces and the number thereof is 2, and a position at which one amount of correction of residual dynamic unbalance is fixed is offset 180° from a position at which the other amount of correction of residual unbalance is fixed.

* * * * *